July 17, 1962

T. F. UPTON 3,044,210

TELEPHONE BOOK STANDS

Filed July 12, 1961

INVENTOR.

Thomas F. Upton

BY

S. Stephen Baker

ATTORNEY

United States Patent Office 3,044,210
Patented July 17, 1962

3,044,210
TELEPHONE BOOK STANDS
Thomas F. Upton, Forest Hills, N.Y., assignor to American Loose Leaf Corporation, Clifton, N.J., a corporation of Delaware
Filed July 12, 1961, Ser. No. 123,559
5 Claims. (Cl. 45—85)

This invention relates to telephone book stands or supports which are connected to a telephone booth and of the type where one or more telephone books may be swingably supported in a stand for convenient consultation and maintenance. The telephone book stand of this invention finds particular usefulness in outdoor telephone booths. It is of the type which was described in my United States Patent No. 2,937,470, dated May 24, 1960.

In the above patent I disclosed, among other advantages, a telephone book stand where the books could be swung up into a specially facilitated reading position. Thus, the book supporting mechanism was permitted to tilt outwardly so as to provide better visual access to the inner edges of the book. However, in the use of telephone book stands such as described above, a particular problem has arisen in that users of the book would often leave the book in an open position whereupon a subsequent user might bump against the covers and damage the book. Further, it is highly desirable to cause the book to return to a normal rest position within the stand so as not to leave the pages exposed.

With the foregoing in mind, I have devised a telephone book stand structure which is extremely simple but which not only tends to return the book automatically to a sheltered position but which is of even further utility in that it supports the book most conveniently for consultation. Thus the structure simply involves forming an outward and downward bulge in the outer frame member. The bulge better supports the book in an open position while it automatically guides the book downwardly and into a sheltered position after the user is through. The bulge is positioned so as to take peculiar advantage of the disposition of the stand in the telephone booth. Thus the wall of the telephone booth is relied upon as an element which tends to urge the book against the bulge which in turn directs the book downwardly.

The bulge has a further considerable advantage in that it manoeuvres or "nudges" the booth occupant away from a tendency to lean or press against the stand and thereby damage it or the book.

The invention will be further understood from the following description and drawings in which.

Figures 1, 2:
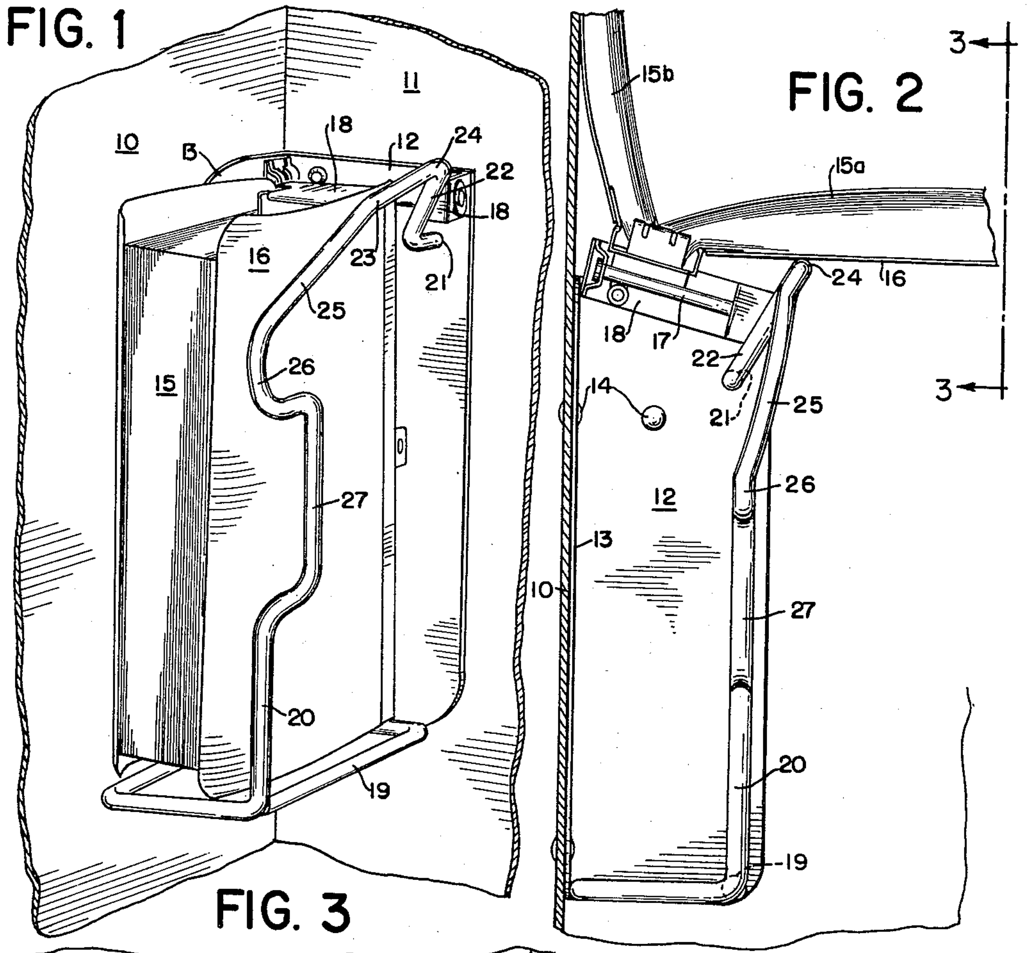
FIGURE 1 is a perspective view of the improved structure as connected to a telephone booth.
FIGURE 2 is a similar view thereof with the book in the open and supported position.
Figure 3:
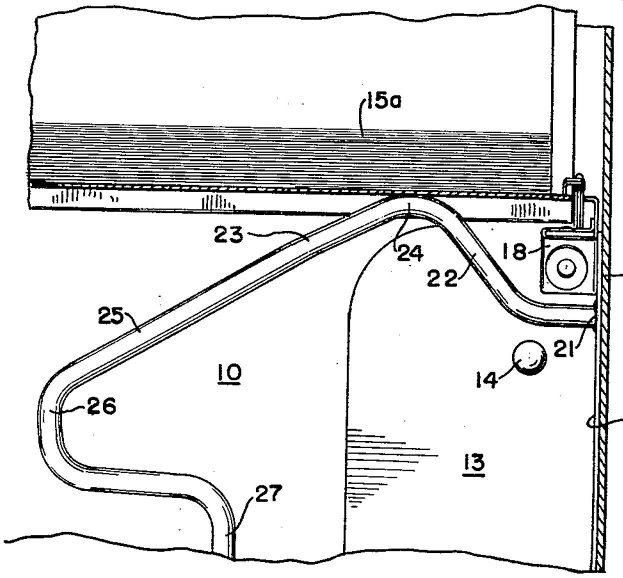
FIGURE 3 is a side view as taken along the line 3—3 of FIGURE 2.

The walls 10 and 11 are those of a conventional telephone booth. Wall 11 is opposite the door of the booth while wall 10 is substantially opposite from the telephone itself, the door and telephone not being shown herein.

The book supporting structure comprises the rear wall 12 and integral side wall 13 which are generally of steel and form a 90° angle with each other. Walls 12 and 13 are respectively connected to the booth walls 11 and 10 as by rivets 14 so that the book supporting structure is side-by-side with wall 10. It may be observed that the book supporting structure, except for a rod frame member as will hereinafter be described, completely duplicates the structure shown in my above Patent No. 2,937,470. However, a brief description is hereby given in order to clarify the function and nature of the improved rod frame member.

As was described in the above patent, the telephone book 15 in its binder 16 (which includes the covers and backbone) is swingably connected to the transverse rod 17 which is incorporated in a tiltable bracket 18. The tilting of the bracket is shown in FIGURE 2 herein. The purpose thereof, as was explained in the above mentioned patent, is to facilitate consultation of the book, particularly inner portions thereof. It is understood, however, that the instant invention, while it is shown specifically applied to such a supporting tilting structure, is not necessarily limited thereto.

Essentially, the telephone book rests in a normal downward position shown in FIGURE 1 and it may be caused to rotate in a substantially vertical plane which brings it out of its sheltered, normal rest position, and into an exposed position where its pages may be consulted. This action is, in itself, very well known.

The book supporting structure includes a framework comprising a rectangular bottom rod member 19 and a rod frame member 20 which is integral with the rod member 19. The top end of rod frame member 20 is connected at point 21 to the wall 12, immediately below the tilting bracket 18. Frame member 20 is parallel to wall 10 and defines therewith a chamber on which book 15 is normally disposed.

The specific configuration of the top section of frame member 20 comprises the principal element of this invention. Thus, from top connection point 21, adjacent one end of transverse rod 17, the rod frame member 20 first extends forwardly in a horizontal plane, for about an inch, in the form shown. It then extends both outwardly and upwardly along section 22 thereof at an angle of about 45° and then comes downwardly and inwardly along downwardly directed portion 23, at about the same angle, so as to form an outward bulge 24. Bulge 24 thus lies in an inclined plane, the plane being about 45° from horizontal.

Thereafter, a further downwardly and substantially linearly forwardly directed portion 25 leads to the front section 26, the portion 25 being inwardly relative to bulge 24 and extending substantially in a vertical plane although it is not as inward as is connection point 21, as evident from FIGURE 2. The recessed section 27 is merely for the purpose of facilitating gripping of the book as was described in the above mentioned previous patent.

As observed in FIGURE 2, bulge 24 extends outwardly of the bracket 18 or wall 12. Accordingly, the bulge constitutes a "nudging" member which tends to manoeuvre an occupant away from the book supporting structure. In other words, it discourages an occupant from resting his weight on the structure since the bulge would constitute an uncomfortable factor.

When the book 15 together with its cover 16 is swung upwardly in a vertical plane, and the book then opened as illustrated in FIGURE 2, the bracket 18 will tilt as described in the prior patent. In accordance with the instant invention, the substantially horizontal portion 15*a* of the book will rest upon the bulge 24 while the other portion 15*b* will rest against the wall 10 which will support it in a substantially upright position. This constitutes the consulting position of the book, with a large portion of the weight of the book generally supported by the downwardly directed portion 23 of the bulge 24 as well as the downwardly directed succeeding portion 25.

The co-action of the wall 10 of the telephone booth is of importance since it insures that the weight of the book together with its binding and mounting is in a direction away from wall 10. Accordingly the book, unless it is held in place by the user, will automatically be guided by the aforesaid downwardly directed portions of the top section of rod frame member 20, so that the book will return to its sheltered normally downward position.

There has been shown what is now considered a preferred embodiment of the invention but it is obvious that changes and omissions may be made without departing from its spirit.

What is claimed is:

1. The combination with a telephone booth vertical wall of a book supporting structure connected thereto and side-by-side therewith, said book supporting structure comprising means for swingably suspending at least one book therefrom in a normal downward position, and a frame member disposed parallel to said wall and spaced therefrom so as to define therewith a chamber in which said book is normally disposed and out of which said book may be swung upwardly in a vertical plane for consulation purposes, and a top rod section on said frame member, said top rod section being adapted to support said book when the book is swung upwardly out of said chamber and away from said wall, said top rod section having a forwardly disposed downwardly directed portion whereby a book resting thereon will be urged downwardly to its said normal downward position.

2. The combination according to claim 1 and wherein said top rod section is formed with an outward bulge for supporting the book in its open position, said downwardly directed portion including the forward end of said bulge.

3. The combination according to claim 2 and wherein said first named means comprises a bracket and a transverse rod disposed across said bracket and adapted to support said book swingably suspended therefrom, said top rod section having one end thereof disposed adjacent to one end of said transverse rod and then extending first upwardly and outwardly, and then downwardly and inwardly thereof to form said bulge.

4. The combination with a telephone booth vertical wall, of a book supporting structure, said book supporting structure comprising at least one side wall connected to said booth vertical wall whereby the book supporting structure is connected side-by-side to said booth vertical wall, a bracket connected to said sidewall, a transverse rod disposed across said bracket and adapted to support a book swingably suspended therefrom, a frame member disposed oppositely to said sidewall and spaced therefrom so as to define therewith a chamber in which said book is normally disposed and out of which said book may be swung upwardly in a vertical plane for consulation purposes, said frame member having a top rod section formed with an outward bulge whereby at least a portion of said book may be swung outwardly, after the book has been swung upwardly in a vertical plane, so that said book portion may rest on said bulge while said telephone booth vertical wall tends to urge the weight of said book toward said bulge, said bulge having a forwardly disposed downwardly directed portion whereby a book resting thereon will be urged downwardly into its normal disposition within said chamber.

5. The combination according to claim 4 and wherein said bulge is disposed adjacent to one end of said transverse rod and extends therefrom first upwardly and outwardly, and then downwardly and inwardly and thereafter continues into a further downwardly directed portion, said last named downwardly directed portion being in a vertical plane, and said bulge lying in an inclined plane of approximately 45° from horizontal.

References Cited in the file of this patent

UNITED STATES PATENTS

| | | |
|---|---|---|
| 2,854,784 | Nawman | Oct. 7, 1958 |
| 2,862,329 | Guinane et al. | Dec. 2, 1958 |
| 2,937,470 | Upton | May 24, 1960 |